United States Patent [19]
Cilano

[11] Patent Number: 5,443,431
[45] Date of Patent: Aug. 22, 1995

[54] DIFFERENTIAL WITH FRICTION-ENHANCING WEDGE

[75] Inventor: Joseph E. Cilano, Bergen, N.Y.

[73] Assignee: Zexel-Gleason USA, Inc., Rochester, N.Y.

[21] Appl. No.: 135,927

[22] Filed: Oct. 13, 1993

[51] Int. Cl.⁶ .................... F16H 48/10; F16H 48/22
[52] U.S. Cl. ................................. 475/249; 475/252; 475/339
[58] Field of Search ............... 475/248, 249, 252, 253, 475/338, 339, 346

[56] References Cited

U.S. PATENT DOCUMENTS

| | | |
|---|---|---|
| 1,938,649 | 12/1933 | Welsh . |
| 2,651,215 | 9/1953 | Schoenrock . |
| 2,789,446 | 4/1957 | Schoenrock . |
| 2,859,641 | 11/1958 | Gleasman . |
| 2,972,265 | 2/1961 | Walter . |
| 3,292,456 | 12/1966 | Saari . |
| 3,375,736 | 4/1968 | Saari ................................. 475/249 |
| 3,706,239 | 12/1972 | Myers . |
| 3,738,192 | 6/1973 | Belansky . |
| 4,365,524 | 12/1982 | Dissett et al. . |
| 4,677,876 | 7/1987 | Dissett . |
| 5,055,096 | 10/1991 | Riemscheid et al. . |
| 5,122,101 | 6/1992 | Tseng . |
| 5,147,252 | 9/1992 | Mace et al. . |
| 5,169,370 | 12/1992 | Dye et al. . |

FOREIGN PATENT DOCUMENTS

| | | |
|---|---|---|
| 0130806 | 1/1985 | European Pat. Off. . |
| 2234791 | 2/1991 | United Kingdom . |

*Primary Examiner*—Charles A. Marmor
*Assistant Examiner*—Sherry Lynn Estremsky
*Attorney, Agent, or Firm*—Eugene Stephens & Associates

[57] ABSTRACT

Increased friction is generated in a parallel-axis gear differential by wedges 66 having respective bearing surfaces 68 and 70 for rotationally supporting outside diameter surfaces of a pair of planet gears 38 and 40. The wedges 66 react to bearing loads within a differential housing 10 by urging the planet gears 38 and 40 toward a condition of zero backlash with a pair of side gears 34 and 36.

11 Claims, 2 Drawing Sheets

DIFFERENTIAL WITH FRICTION-ENHANCING WEDGE

FIELD OF INVENTION

The invention relates to automotive differentials having housings that are rotatable by drive torque and planetary gear sets that are mounted within the housings for dividing the drive torque between a pair of output shafts. The housings include bearing surfaces that develop frictional resistance to relative rotation of the output shafts.

BACKGROUND

A typical automotive differential includes a compound planetary gear set mounted within a housing. The planetary gear set interconnects a pair of output shafts for rotation in opposite directions with respect to the housing. Engine power rotates the housing about a common axis of rotation shared by the output shafts.

The planetary gear set is generally arranged to permit the output shafts to rotate by equal amounts but in opposite directions with respect to the housing. Accordingly, the housing rotates about the common axis of the output shafts at the average speed of the two output shafts. Drive torque is distributed between the two relatively rotating output shafts in accordance with the efficiency of the planetary set.

Sun gear members of the planetary set, also referred to as "side gears", are coupled to inner ends of the output shafts. Planet gear members of the same set operatively connect the two side gears for rotation in opposite directions. Ordinarily, the sun gear members are bevel gears, and the planet gear members are bevel pinions that mesh with both side gears.

However, such bevel gear planetary gear sets are relatively efficient (i.e., only small torque differences can be supported between the output shafts), and this limits the total amount of drive torque that can be delivered to the output shafts under uneven traction conditions. For example, if drive wheels coupled to the output shafts have uneven amounts of traction, the total drive torque is limited to a little more than two times the amount of drive torque that can be delivered to the drive wheel having less traction.

A wide variety of differential modifications and alternative differential designs have been proposed to make better use of the total traction available to both drive wheels. For example, spring-loaded clutch packs have been used to provide a predetermined minimum resistance to relative rotation between output shafts (i.e., differentiation). However, the minimum resistance opposes differentiation even when no drive torque is being delivered to the output shafts and yet may provide too little resistance to differentiation when more drive torque is delivered.

Worm gearing has been used in gear differentials to develop considerable frictional resistance to differentiation as a relatively constant proportion of the total drive torque. This torque proportioning characteristic is more commonly expressed as a "bias ratio", which is a ratio of the respective amounts of torque in the two output shafts. Worm gear differentials, such as the one disclosed in U.S. Pat. No. 2,859,641 to Gleasman, generally exhibit bias ratios of 3.5 to 1 or greater over a wide range of total drive torque.

Parallel-axis gearing, such as spur and helical gearing, has also been used in gear differentials to develop frictional resistance to differentiation as a smaller proportion of the total drive torque. For example, U.S. Pat. No. 3,706,239 to Myers discloses a parallel-axis gear differential of a type that exhibits bias ratios of 2.5 to 1 or less.

However, bias ratios within a range of between 2.5 to 1 and 3.5 to 1 are now preferred for many automotive applications. Bias ratios of at least 2.5 to 1 are preferred for delivering sufficient amounts of additional drive torque under uneven traction conditions. In contrast, bias ratios greater than 3.5 to 1 are generally not needed to compensate for traction differences between drive wheels and can interfere with desired differentiation in turns.

To provide bias ratios within the range of 2.5 to 1 to 3.5 to 1, attempts have been made to reduce the bias ratios of worm gear differentials and to increase the bias ratios of parallel-axis gear differentials. For example, the bias ratios of worm gear differentials have been somewhat reduced by increasing the side gear lead angles and by using friction-reducing washers at gear end faces.

U.S. Pat. 5,169,370 to Dye et al. of the present assignee proposes to increase the bias ratio of a parallel-axis gear differential by dividing the planet gears into two gear portions having opposite hand helix angles that increase axial thrust of the planet gears. Although this approach increases bias ratio, the cost of producing the planet gears is also significantly increased.

An alternative approach to increasing bias ratio in a parallel-axis gear differential is proposed in United Kingdom Patent Application 2,234,791. Pairs of planet gears are distributed asymmetrically about the side gears so that a radial force urges the side gears into a frictional engagement with the housing. This approach limits the size or number of planet gears that can be used to operatively connect the side gears, adds to housing complexity, and subjects the housing to uneven distortions.

SUMMARY OF INVENTION

My invention improves upon my earlier invention entitled Gear Mounting System for Differential, U.S. patent application Ser. No. 058,480, filed 6 May 1993, which is hereby incorporated by reference. My earlier invention expands the range of bias ratios that can be effectively and economically supported by parallel-axis gear differentials. My present invention further expands this range.

Similar to my earlier invention, my present invention can be practiced as an improvement to parallel-axis gear differentials that include the conventional features of a housing rotatable about a common axis of a pair of output shafts and a planetary gear set mounted within the housing for interconnecting the output shafts. A pair of side gears of the planetary gear set are positioned within the housing for rotation with the pair of output shafts, and two or more pairs of planet gears are positioned within the housing in engagement with the side gears for rotation about respective axes that extend parallel to the common axis of rotation.

The planet gear pairs are mounted within the housing between pedestals having respective bearing surfaces for rotationally supporting outside cylinder surfaces of the planet gears. A tubular casing portion of the housing surrounds the pedestals and the pairs of planet gears. Friction-enhancing wedges supported by the casing portion have respective bearing surfaces for further rotationally supporting outside cylinder surfaces of the planet gears.

The pedestals are pivotable with respect to the housing in directions that move the planet gear members of the pairs further into mesh with each other toward a condition of zero backlash for increasing frictional resistance to relative rotation of the output shafts (i.e., differentiation). The friction-enhancing wedges cooperate with the pedestals for moving the planet gears further into mesh with the side gears toward a condition of zero backlash for further increasing frictional resistance to differentiation. Both the pivotable pedestals and the friction-enhancing wedges manage reactionary forces of the planet gear pairs to develop additional frictional resistance to differentiation proportional to the torque that is transmitted by the planet gears.

DRAWINGS

DETAILED DESCRIPTION

Figure 1:
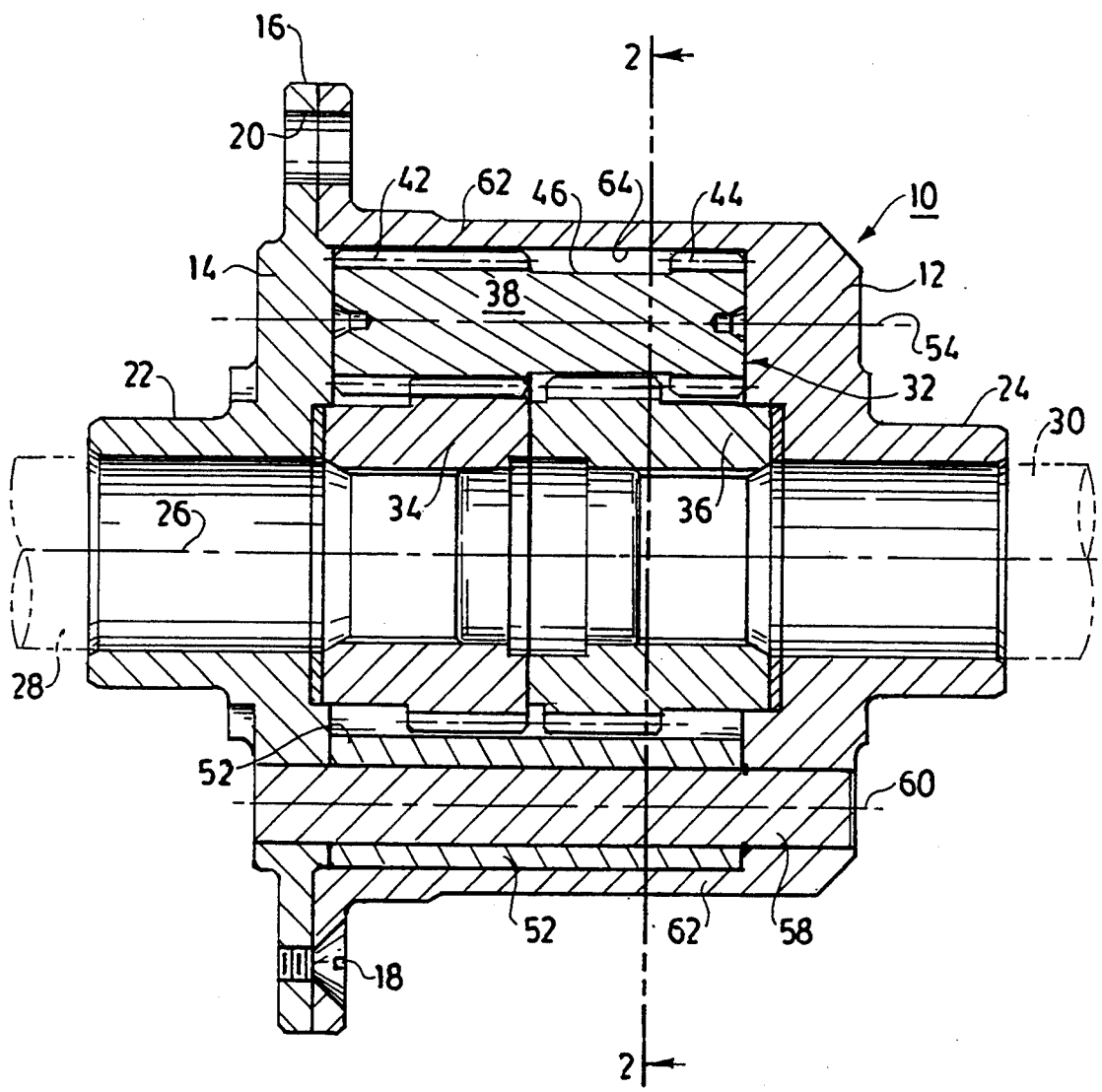
FIG. 1 is an axial cross-sectional view along line 1–1 of FIG. 2 showing my invention as an improvement to a parallel-axis gear differential.
Figure 2:
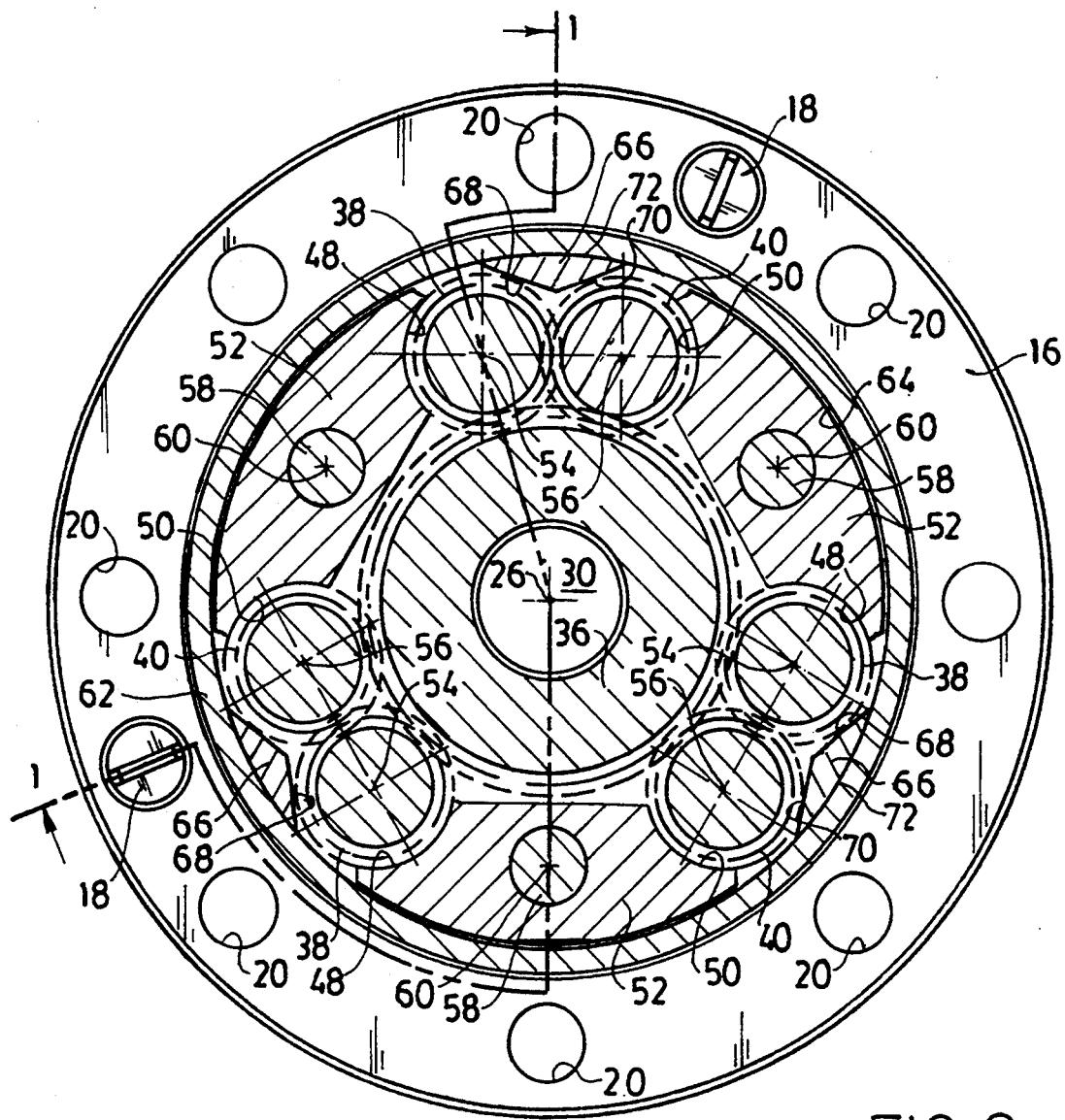
FIG. 2 is a traverse cross-sectional view along line 2–2 of FIG. 1 showing my friction-enhancing wedges having bearing faces for engaging outside cylinder surfaces of planet gear pairs.
Figure 3:
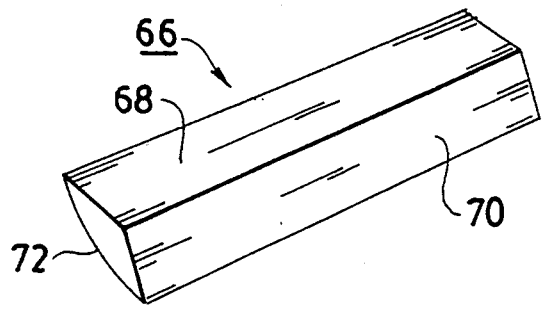
FIG. 3 is an isometric view of one of the friction-enhancing wedges shown in FIG. 2.

A parallel-axis gear differential improved in accordance with my invention is shown in the drawing figures. A housing 10 includes a main body 12 and an end cap 14, both having end faces that join together forming a flange 16. Screws 18 hold the main body 12 and end cap 14 together until a ring gear (not shown) is bolted to the flange 16 through holes 20. Trunnions 22 and 24 provide bearing surfaces for rotating the housing 10 about a common axis 26 of a pair of output shafts 28 and 30.

The housing 10 encloses a planetary gear set 32 that interconnects the output shafts 28 and 30 for opposite directions of rotation. Side gears 34 and 36 of the planetary gear set are respectively coupled to the output shafts 28 and 30 for rotation about the common axis 26. Three pairs of planet gears, each pair having members 38 and 40, interconnect the side gears 34 and 36 for rotation in opposite directions. Each of the planet gear members 38 and 40 includes a main gear section 42 and a transfer gear section 44 separated by a stem section 46. The main gear section 42 of each of the planet gear members meshes with one of the side gears 34 or 36 and with the transfer gear section 44 of its mating planet gear.

Outside diameter surfaces of the planet gear members 38 and 40 are supported by respective bearing surfaces 48 and 50 of pedestals 52 for rotation about axes 54 and 56 that extend parallel to the common axis 26. Pins 58 support the pedestals within the housing 10 for pivotal movement about axes 60 that also extend parallel to the common axis 26.

The pedestals 52 and the planet gear members 38 and 40 are surrounded by a tubular casing portion 62 of the main body 12. The casing portion 62 has a cylindrical inner bearing surface 64 supporting friction-enhancing wedges 66 between the planet gear members 38 and 40 of each pair. The friction-enhancing wedges 66 have first and second bearing surfaces 68 and 70 for rotationally supporting the outside diameter surfaces of the planet gear members 38 and 40 and a third bearing surface 72 for slidably engaging the inner bearing surface 64 of the casing portion.

The first and second bearing surfaces 68 and 70 are oriented with respect to the third bearing surface 72 of the wedge for preventing contact between the planet gear members 38 and 40 and the inner bearing surface 64 of the casing portion. Preferably, the first and second bearing surfaces 68 and 70 are also oriented with respect to each other through an included angle that is no greater than 180 degrees. In the present example, the first and second bearing surfaces 68 and 70 are relatively inclined through 150 degrees. The amount of inclination between the bearing surfaces 68 and 70 determines an amount of radial movement imparted to the planet gear members 38 and 40 by the friction-enhancing wedges 66 in reaction to given amounts of opposing circumferential movements imparted to the same gears by adjacent pedestals 52.

In addition to moving the planet gear members 38 and 40 together, the adjacent pedestals 52 also slightly shift the planet gear members in a common direction along the inner bearing surface 64 of the tubular casing. The friction-enhancing wedges 66 shift circumferentially with the planet gear members 38 and 40 to remain in centered positions between them. The third bearing surface 72 of the friction-enhancing wedges 66 matches the curvature of the inner bearing surface 64 of the tubular casing 62 to provide a low-friction interface that permits the circumferential movement of the wedges 66. The third bearing surface 72 could also be metallurgically treated to reduce friction.

The friction-enhancing wedges 66 are positioned to react to a decrease in center distance between the planet gear members 38 and 40 by also decreasing center distances between the planet gear members 38 and 40 and the side gears 34 and 36. The radial movement imparted by the wedges 66 squeezes the planet gear members 38 and 40 between the wedges and the side gears 34 and 36 toward a condition of zero backlash to increase frictional resistance to rotation of the planet gear members.

Preferably, the friction-enhancing wedges 66 are made of a high-alloy tool steel to increase wear resistance. However, the wedges 66 are preferably treated to a hardness that is less than the hardness of the planet gear members 38 and 40 to limit wear of the gear members. The wedges 66 could also be made with curved bearing surfaces to reduce stresses between the wedges and the planet gears.

The friction-enhancing wedges could also be used to enhance the performance of other differential designs including designs with fixed pedestals or pedestals that are split in two sections for independently engaging planet gear pairs as shown in my copending application U.S. Ser. No. 058,480.

I claim:

1. A differential assembly for dividing drive torque between a pair of output shafts comprising:
   a housing rotatable about a common axis of the pair of output shafts;
   planetary gearing mounted within said housing for interconnecting the output shafts;
   a casing portion of said housing surrounding said planetary gearing;
   a wedge supported by said casing portion and having first and second bearing surfaces rotationally supporting outside diameter surfaces of adjacent gear members of said planetary gearing;

said casing portion including an inner support surface and said wedge including a third bearing surface engaging said inner support surface of the casing portion;

said first and second bearing surfaces of the wedge being positioned with respect to said third bearing surface of the wedge for preventing contact between said adjacent gear members and said inner support surface of the casing;

said third bearing surface of the wedge slidably engaging said inner support surface of the casing; and said third bearing surface of the wedge and said inner support surface of the casing being shaped for permitting angular motion between said wedge and said casing about the common axis of the pair of output shafts.

2. The differential assembly of claim 1 in which said adjacent gear members are planet gears and said housing includes pedestal portions having fourth and fifth bearing surfaces for rotationally supporting outside diameter surfaces of said adjacent planet gears.

3. The differential assembly of claim 2 in which said pedestals are pivotable about respective axes that extend parallel to the common axis of the pair of output shafts.

4. The differential assembly of claim 2 in which said pedestals urge said adjacent planet gears toward a condition of zero backlash with each other.

5. The differential assembly of claim 4 in which said planetary gearing includes side gears adapted for rotation with the output shafts, and said wedges urge said adjacent planet gears toward a condition of zero backlash with said side gears.

6. A parallel-axis gear differential comprising:
a housing rotatable about a common axis of a pair of output shafts;
a pair of side gears positioned within said housing for rotation with the pair of output shafts;
pairs of planet gears positioned within said housing in engagement with said side gears for rotation about respective axes that extend parallel to said common axis of rotation;
pedestals having respective bearing surfaces for rotationally supporting outside diameter surfaces of said planet gears;
a casing portion of said housing having an inner surface surrounding said pedestals and said pairs of planet gears; and
friction-enhancing wedges supported by said inner surface of the casing portion and having respective bearing surfaces for further rotationally supporting the outside diameter surfaces of said planet gears.

7. The differential of claim 6 in which said pedestals are pivotable about respective axes that also extend parallel to said common axis.

8. The differential of claim 7 in which said pedestals are pivotable in directions that move members of said planet gear pairs further into mesh with each other toward a condition of zero backlash.

9. The differential of claim 8 in which said friction-enhancing wedges are responsive to movement of said planet gear members further into mesh with each other for urging said planet gear members further into mesh with said side gears toward a condition of zero backlash.

10. The differential of claim 7 in which said pedestals together with said friction-enhancing wedges prevent contact between said planet gears and said inner surface of the casing.

11. The differential of claim 10 in which said inner surface of the casing portion is cylindrical for permitting angular motion between said friction-enhancing wedges and said casing about the common axis of the pair of output shafts.

* * * * *